(12) United States Patent
Kennedy (10) Patent No.: US 11,674,596 B2
(45) Date of Patent: Jun. 13, 2023

(54) SEAL WITH FIRST ELASTOMERIC ELEMENT AND SECOND ELASTOMERIC ELEMENT

(71) Applicant: Kennedy Valve Company, Elmira, NY (US)

(72) Inventor: Paul Kennedy, Horseheads, NY (US)

(73) Assignee: KENNEDY VALVE COMPANY, Elmira, NY (US)

(*) Notice: Subject to any disclaimer, the term of this patent is extended or adjusted under 35 U.S.C. 154(b) by 0 days.

(21) Appl. No.: 17/516,064

(22) Filed: Nov. 1, 2021

(65) Prior Publication Data

US 2023/0132709 A1 May 4, 2023

(51) Int. Cl.
*F16J 15/10* (2006.01)

(52) U.S. Cl.
CPC .................................. *F16J 15/104* (2013.01)

(58) Field of Classification Search
CPC ........ F16J 15/104; F16J 15/106; F16J 15/062; F16J 15/022
See application file for complete search history.

(56) References Cited

U.S. PATENT DOCUMENTS

| | | | | |
|---|---|---|---|---|
| 2,891,288 | A * | 6/1959 | Daley | B29C 44/5654 428/318.6 |
| 3,413,389 | A * | 11/1968 | Footner | B29C 48/0012 428/156 |
| 4,442,174 | A * | 4/1984 | Neumann | F16J 15/104 428/398 |
| 6,730,385 | B1 * | 5/2004 | Tanaka | C08J 5/124 156/335 |
| 10,571,053 | B2 * | 2/2020 | Proof | B29C 48/21 |
| 10,731,760 | B2 * | 8/2020 | Ishigami | F16J 15/0893 |
| 2005/0223536 | A1 * | 10/2005 | Botrie | F16J 15/14 29/527.2 |
| 2010/0018778 | A1 * | 1/2010 | Nanayakkara | E21B 10/25 175/371 |
| 2010/0044970 | A1 * | 2/2010 | Suzuki | F16J 15/061 277/592 |
| 2010/0084827 | A1 * | 4/2010 | Peddle | F16J 15/061 277/644 |
| 2010/0270753 | A1 * | 10/2010 | Knapp | F16J 15/104 277/608 |
| 2015/0145217 | A1 * | 5/2015 | Zhao | F16J 15/022 277/654 |
| 2018/0209543 | A1 * | 7/2018 | Nachtmann | F16J 15/102 |

(Continued)

FOREIGN PATENT DOCUMENTS

| | | | | |
|---|---|---|---|---|
| JP | 2005127520 | A | * 5/2005 | ............. F16J 15/025 |
| JP | 2007100900 | A | * 4/2007 | |

*Primary Examiner* — Eugene G Byrd
(74) *Attorney, Agent, or Firm* — Brown & Michaels, PC (57) ABSTRACT

A seal includes a first elastomeric ring and a second elastomeric ring. The first elastomeric ring has an annular cavity, and the second elastomeric ring is in the annular cavity. In another embodiment, a seal includes a first elastomeric element and a second elastomeric element. The first elastomeric element has a length extending along an axis, a first surface facing radially outward with respect to the axis, and a second surface facing radially inward with respect to the axis. The second surface defines a cavity extending along the axis. The second elastomeric element is in the cavity and has a first surface facing radially outward with respect to the axis.

27 Claims, 6 Drawing Sheets

(56) References Cited

U.S. PATENT DOCUMENTS

| | | | |
|---|---|---|---|
| 2019/0001167 A1* | 1/2019 | Sibello | A62C 2/06 |
| 2019/0162308 A1* | 5/2019 | Stehlig | F16J 15/104 |
| 2021/0003218 A1* | 1/2021 | Lee | F16L 23/18 |
| 2021/0079833 A1* | 3/2021 | Popa | F16K 5/0678 |
| 2021/0080042 A1* | 3/2021 | Pacheco | F16J 15/104 |
| 2021/0108725 A1* | 4/2021 | Boyd | B64C 7/00 |

\* cited by examiner

SEAL WITH FIRST ELASTOMERIC ELEMENT AND SECOND ELASTOMERIC ELEMENT

BACKGROUND OF THE INVENTION

Field of the Invention

The invention pertains to the field of sealing elements. More particularly, the invention pertains to a dual durometer sealing element.

Description of Related Art

Seals provide fluid-tight seals in a multitude of devices. A compression seal provides a fluid-tight seal through compression between two elements, such as a pipe and a compression element, e.g. a push ring, a wall, or another hard surface. The compression forces between the two elements force the deformable material of the seal to conform to and fill gaps or surface irregularities, thereby preventing liquid flow between the mating surfaces of the two elements.

A common type of compression seal is an elastomeric element with a circular cross section, such as an elastomeric "o-ring". These compression seals can become misaligned with the desired position in a joint between two elements. This misalignment results in an uneven amount of compression force being exerted on the seal, which causes both excessive strain on one part of the seal and insufficient compression force on the opposite part of the seal, resulting in less effective sealing and an increase in maintenance requirements.

These conventional seals are also subject to rolling and twisting due to friction as compressive force is added. Rolling and twisting cause excessive and unbalanced strain on the seal, which can eventually result in a fracture or tear, and can prevent formation of a properly sealed joint. Tears require replacement of the seal, which takes time and increases costs.

The type of material and its hardness are uniform throughout a conventional sealing element. Accordingly, in selecting a conventional sealing element for a particular sealing application, a compromise is made between providing stronger support and/or durability with a harder material and providing more fluidity and/or conformability with a softer material. Balancing between these two desirable characteristics sacrifices both characteristics—rigidity of the seal to retain its shape and position during compression and deformability to properly conform to the gaps and irregularities between joined surfaces of two elements.

SUMMARY OF THE INVENTION

A seal is disclosed that provides improved benefit of both structure and deformability, as compared to conventional sealing elements.

In accordance with an embodiment, a seal includes a first elastomeric ring and a second elastomeric ring. The first elastomeric ring has an annular cavity, and the second elastomeric ring is in the annular cavity.

In accordance with another embodiment, a seal includes a first elastomeric element and a second elastomeric element. The first elastomeric element has a length extending along an axis, a first surface facing radially outward with respect to the axis, and a second surface facing radially inward with respect to the axis. The second surface defines a cavity extending along the axis. The second elastomeric element is in the cavity and has a first surface facing radially outward with respect to the axis.

In accordance with another embodiment, a pipe fitting assembly includes a pipe fitting and a seal, wherein the pipe fitting has a body, the body has an outer wall, the outer wall is positioned around a flow channel, and the seal is configured to be compressed between the outer wall and a pipe. The seal includes a first elastomeric element and a second elastomeric element. The first elastomeric element has a length extending along an axis, a first surface facing radially outward with respect to the axis, and a second surface facing radially inward with respect to the axis. The second surface defines a cavity extending along the axis. The second elastomeric element is in the cavity and has a first surface facing radially outward with respect to the axis.

DETAILED DESCRIPTION OF THE INVENTION

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terms "approximately" and "about", when qualifying a quantity, shall mean the quantity with a tolerance plus or minus 10 percent of the quantity, unless otherwise specified.

Figure 1:
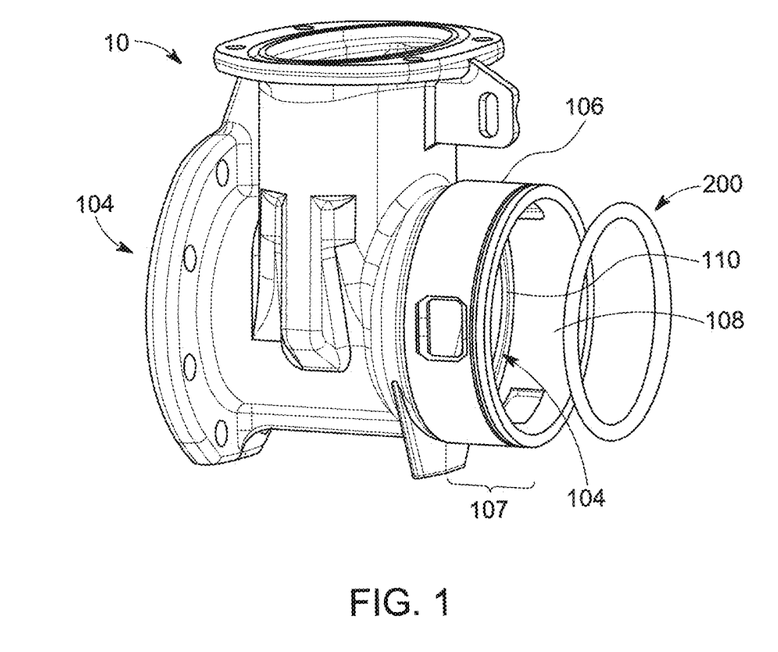
FIG. 1 shows a perspective view of a pipe fitting assembly including a seal unassembled, according to an embodiment of the invention.
Figure 2:
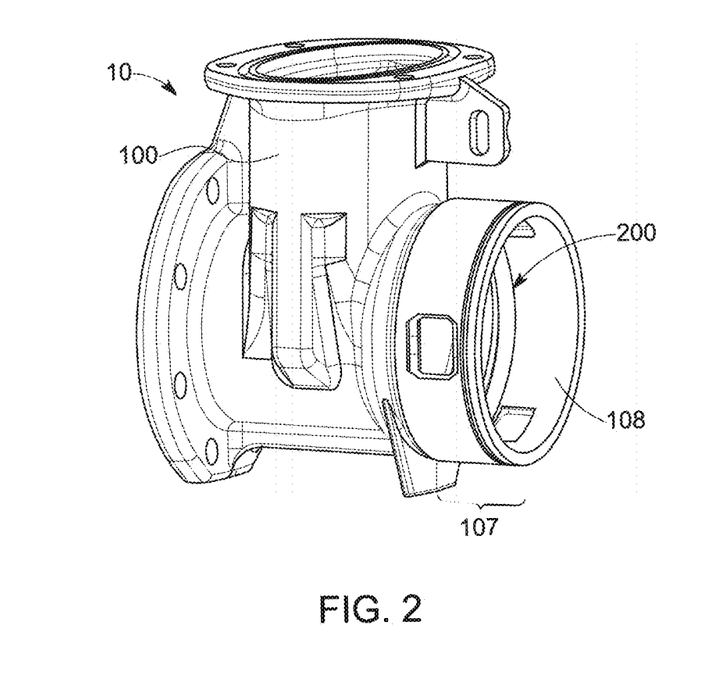
FIG. 2 shows a perspective view of the pipe fitting assembly of FIG. 1, including the seal.

FIG. 1 shows a perspective view of a pipe fitting assembly 10 including a seal 200 unassembled with a pipe fitting 100, according to an embodiment of the invention. FIG. 2 shows a perspective view of the pipe fitting assembly 10, including the seal 200 assembled with the pipe fitting 100. Referring to FIG. 1 and FIG. 2, the pipe fitting assembly 10 is provided as an example of use of the seal 200, and is not intended to be limiting. The seal 200 can be used in a great variety of applications to seal between two or more elements.

The pipe fitting 100 includes a flow passage 104 therethrough. An outer surface 106 of a pipe-receiving portion 107 faces radially outward, and an inner surface 108 of the pipe-receiving portion 107 faces radially inward. A groove 110 can be provided around, and/or cut into, the inner surface 108 of the pipe-receiving portion 107 to receive the seal 200 that ultimately makes a seal between the pipe (not shown) and the inner surface 108 of the pipe-receiving portion 107.

Figure 3:
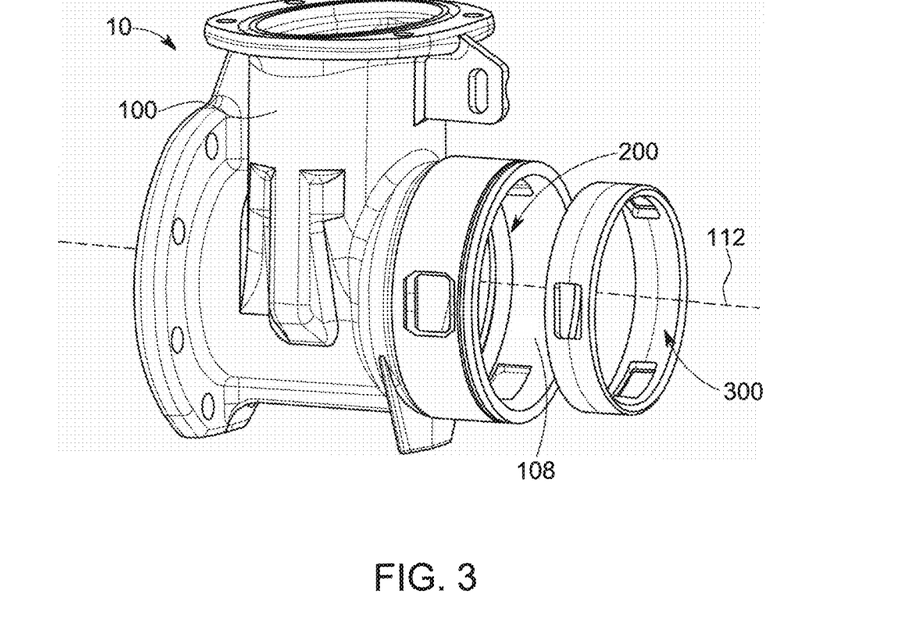
FIG. 3 shows a perspective view of the pipe fitting assembly of FIG. 1, including the seal, with a compression element unassembled.
Figure 4:
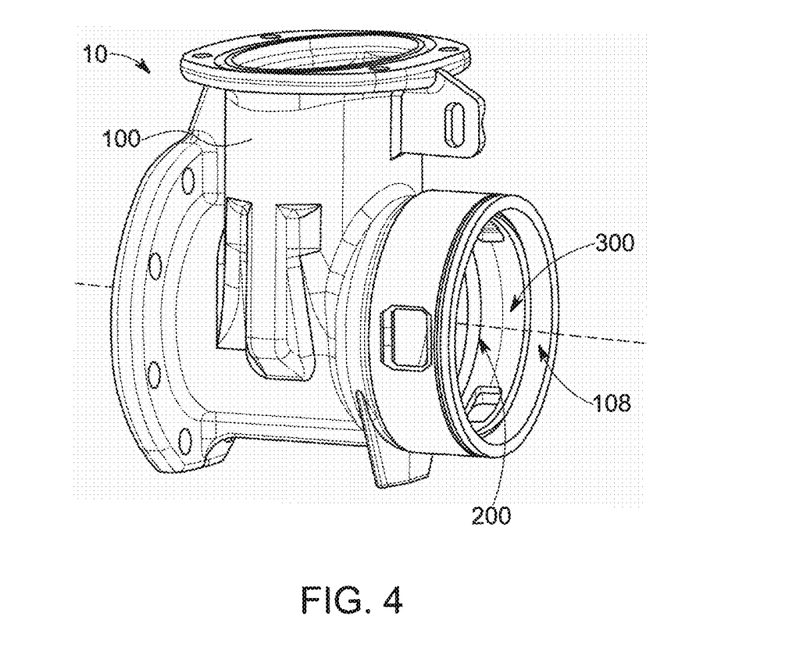
FIG. 4 shows a perspective view of the pipe fitting assembly of FIG. 4, including the seal and the compression element.
Figure 5:
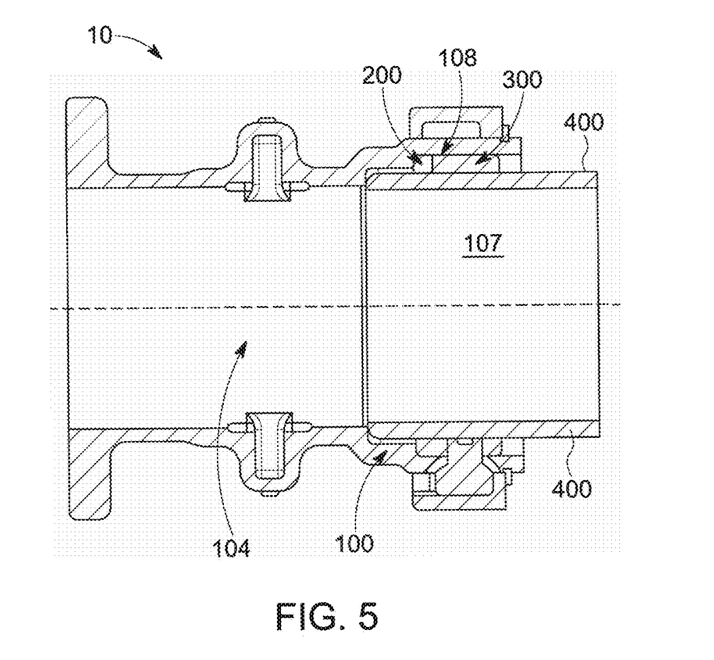
FIG. 5 shows the pipe fitting of FIG. 4, further including a pipe.

FIG. 3 shows a perspective view of the pipe fitting assembly 10, including the seal 200 assembled with the pipe fitting 100, and including an additional compression element 300 unassembled. The compression element 300 can be moved against the seal 200 to compress the seal 300 between the compression element 300 and a side of the groove 110. FIG. 4 shows a perspective view of the pipe fitting assembly 10, including the seal 200 and the compression element 300 assembled with the pipe fitting 100. FIG. 5 shows the pipe fitting 100 of FIG. 4, further including a pipe 400 in the pipe-receiving portion 107. Referring to FIG. 3, FIG. 4, and FIG. 5, the compression element 300 can be inserted into the pipe-receiving portion 107, and after the pipe 400 is also positioned in the pipe-receiving portion 107 through the compression element 300, a force can be applied to press the compression element 300 against the seal 200 and compress the seal 200 in a direction parallel with a center axis 112 of the flow passage 104. The force to press the compression element 300 can be applied to the compression element 300 by any now-know or future-developed means. The compression results in an expansion of the seal 200 in the radially inward direction toward the center axis 112 of the flow passage, decreasing the diameter of the seal 200 to contact and deform against the pipe 400. The seal 200 is compressed between the pipe 400 and the inner surface 108 to prevent passage of fluid between the inner surface 108 and the pipe 400.

Stronger core durability, strength, and hardness of the seal 200 can yield a longer life span and more consistent sealing as the seal 200 wears over its lifetime. High deformability toward exterior contact areas facilitates greater surface contact to achieve greater sealing function. The seal 200 has a strong ability to compensate for unbalanced compressive forces, for example if the compression element 300 is mounted improperly in the pipe fitting 100, is misaligned relative to the seal 200, or if the compression element 300 is damaged or manufactured irregularly/nonuniformly on a side facing the seal 200.

Figure 6:
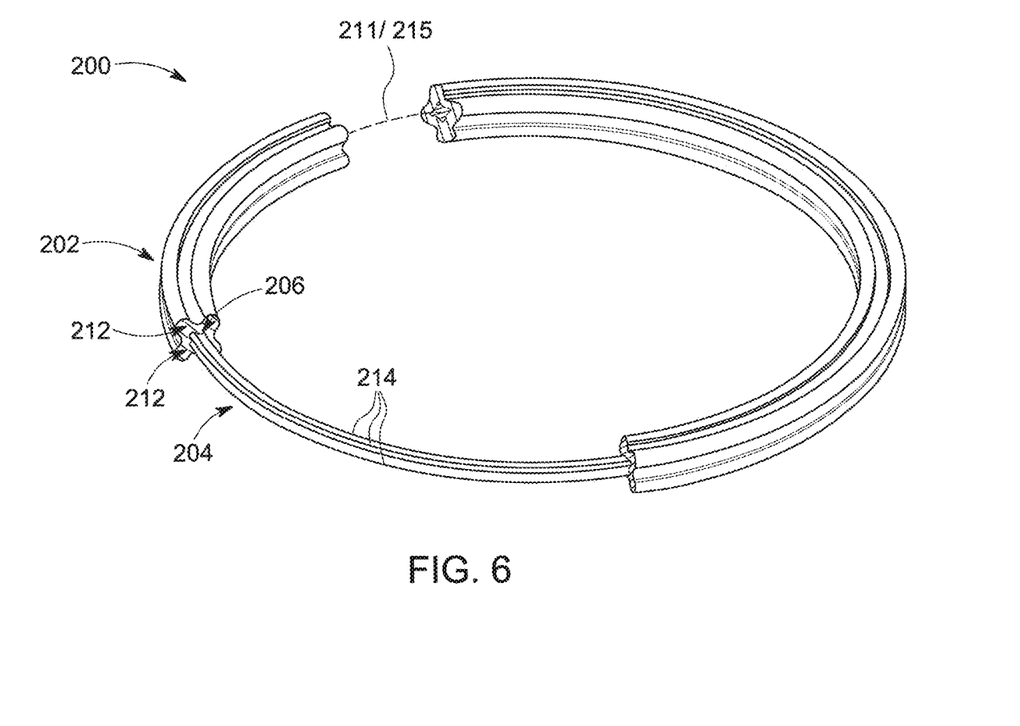
FIG. 6 shows a perspective view of a seal with a first elastomeric element partially cut away to display a second elastomeric element extending within the first elastomeric element, according to an embodiment of the invention.

FIG. 6 shows a perspective view of the seal 200 including a first elastomeric element 202 concentric with a second elastomeric element 204. A portion of the first elastomeric element 202 in FIG. 6 is cut away to display the second elastomeric element 204. Referring to FIG. 6, the first elastomeric element 202 encases the second elastomeric element 204. The first elastomeric element 202 can partly encase the second elastomeric element 202, though the figures illustrate the first elastomeric element 202 fully encasing the second elastomeric element 204, an embodiment in which the first elastomeric element 202 can better be held on and around the second elastomeric element 204 during deformation.

The first elastomeric element 102 has an inner surface 206 defining an outer boundary of a cavity 208. The second elastomeric element 204 is positioned in the cavity 208, with an outer surface 210 adjacent to, or abutting against, the inner surface 206 defining the cavity 208. The second elastomeric element 204 is not adhered or fastened to the first elastomeric element 202. Rather, the second elastomeric element 204 floats freely in the cavity 208, with the inner surface 206 and any friction between the inner surface 206 of the first elastomeric element 202 and the outer surface 210 of the second elastomeric element 204 restricting or resisting movement of the second elastomeric element 204.

Friction between the inner surface 206 and the outer surface 210 can be sufficiently low that the inner surface 206 and the outer surface 210 can slide relative to each other. This separation of the second elastomeric element 204 and the first elastomeric element 202 enables each elastomeric element 202, 204 to deform differently and move relative to each other in an independent manner. The first elastomeric element 202 can deform separately from and differently than the second elastomeric element 204, and portions of each elastomeric element 202, 204 can deform differently within the single elastomeric element 202, 204. The different and/or separate deformation results in portions of the second elastomeric element 204 pushing or pulling to slide within the first elastomeric element 202. The separation of the first elastomeric element 202 from the second elastomeric element 204 facilitates the ability for grater variation in the deformation—both within a single elastomeric element 202, 204 and between the two elastomeric elements 202, 204.

Further, the free-floating configuration of the second elastomeric element 204 within the first elastomeric element 202 facilitates the ability to vary the hardness between the first elastomeric element 202 and the second elastomeric element 204, and/or to achieve an effective result of that hardness variation. Accordingly, the second elastomeric element 204 may have a hardness greater than a hardness of the first elastomeric element 202, and a deformability less than a deformability of the first elastomeric element 202 such that while the second elastomeric element 204 provides stronger support to retain an overall footprint of the first elastomeric element 202, the first elastomeric element 202 is more deformable and can better conform to fill gaps or surface irregularities to provide a good fluid-tight seal. The differing hardness and the physical separation of the first elastomeric element 202 and the second elastomeric element 204 facilitates the ability of the seal 200 to compensate for any unbalanced compressive forces. For example, when compressive forces are unequally spaced around the sealing element 200, the second elastomeric element 204 provides relatively rigid and static support to withstand the greater forces and provide a base against which the first elastomeric 202 element presses, while the first elastomeric element 202 deforms to seal against a fully annular surface area, squeezing from areas of higher compressive force into areas of lower compressive force.

The seal 200, in the illustrated embodiment, is shaped like a ring, which corresponds to the cylindrical shape of the inner surface 108 of the pipe-receiving portion 107 of the pipe fitting 100. The seal 200 can be any desired shape to meet the shape requirements of a particular application.

As shown in FIG. 6, the first elastomeric element 202 can have a plurality of protrusions 212 extended axially and spaced equally around a center axis 211. Such protrusions 212 can flexibly deform when the seal 100 is subjected to compressive forces and friction such that rolling and twisting along a length of the first elastomeric element 202 is reduced or prevented. Rolling and twisting are known to cause excessive strain on sealing elements and to cause fractures that require repair or replacement. When the protrusions 212 of the first elastomeric element 202 are subjected to compressive forces the protrusions 212 can deform, such that less, little, or no stress or deformation is added to the remaining portion of the first elastomeric element 202, thereby reducing or preventing rolling or twisting of the first elastomeric element 202.

Further, the protrusions 112 can deform in an independent manner which enhances the ability of the seal 200 to compensate for any unbalanced compressive forces. For example, when compressive forces are unequally spaced around the first elastomeric element 202, the protrusions 212 deform more where greater force is applied and less where lesser force is applied, thereby equalizing the pressure that the first elastomeric element 202 exerts against the surface to be sealed as a reaction to the compressive forces, resulting in a more uniform seal.

Furthermore, the protrusions 212 provide multiple points of contact with the surface to be sealed, thereby increasing redundancy and reducing maintenance requirements of the seal 200. For example, when after prolonged use one of the protrusions 212 suffers a fracture or tear due to term degradation of the material, the fractured protrusion 212 can no longer provide a properly sealed point of contact against the surface to be sealed, but one or more other structurally intact protrusion 112 can maintain properly sealed points of contact to maintain a fluid-tight seal.

To prevent or inhibit the second elastomeric element 204 from rotating relative to the first elastomeric element 202, and avoid or reduce the chance of damage to the second elastomeric element 204 caused by said rotation, the second elastomeric element 204 can have a plurality of protrusions 214 extended axially and spaced equally around a center axis 215 In this case, the center axis 215 of the second elastomeric element 204 is coaxial with the center axis 211 of the first elastomeric element, though the center axes 211, 215 can be offset. The cavity 206 can be shaped congruently with the second elastomeric element 204. In other words, the concavity 206 of the first elastomeric element 204 has longitudinal concavities to receive the protrusions 212.

Figure 7:
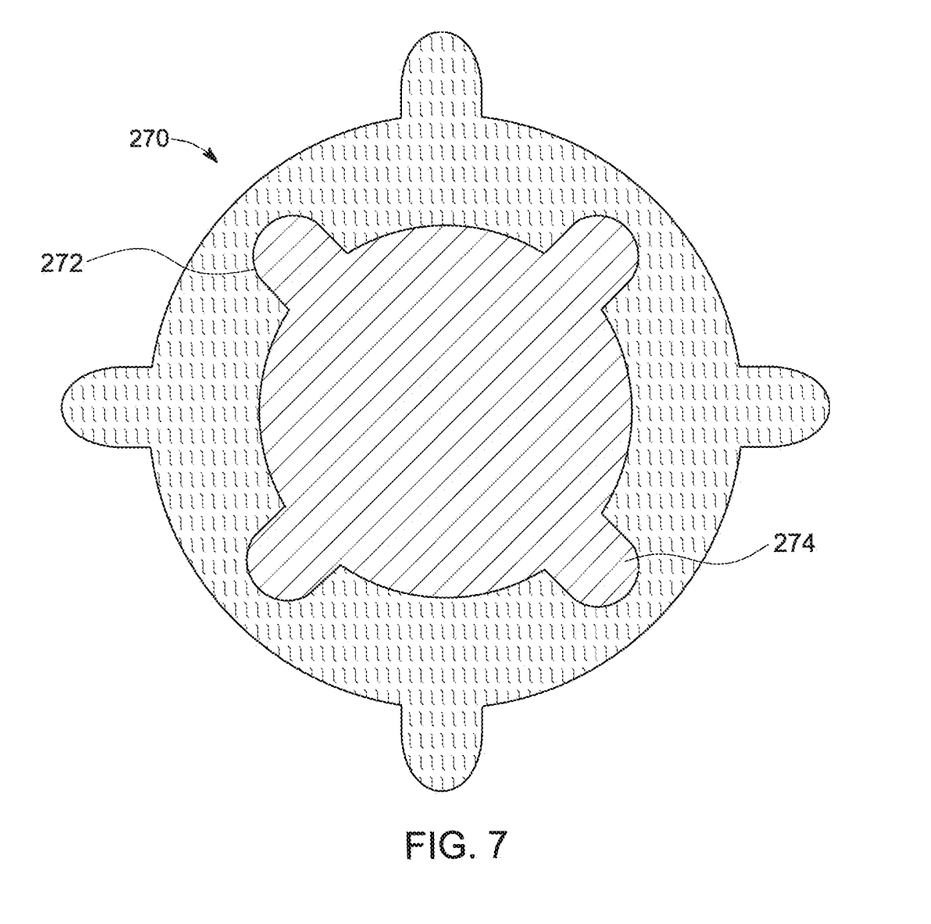
FIG. 7 shows a cross section of a seal, according to an embodiment of the invention.
Figure 8:
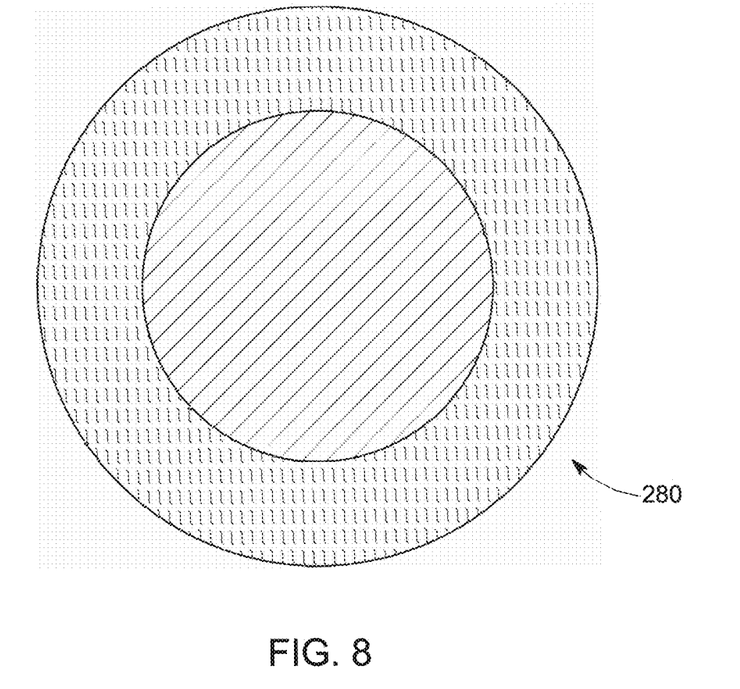
FIG. 8 shows a cross section of a seal, according to an embodiment of the invention.

The protrusions 212 of the first elastomeric element 202 and the protrusions 214 of the second elastomeric element 204 can be shaped and spaced alternatively, as desired, or the protrusions 212, 214 can be omitted. FIG. 7 illustrates a seal 270 like seal 200 with an alternative arrangement of protrusions 272, 274. FIG. 8 illustrates a seal 280 like seal 200 absent protrusions 212, 214. The seal 280 can be simpler and less expensive to manufacture.

Figure 9:
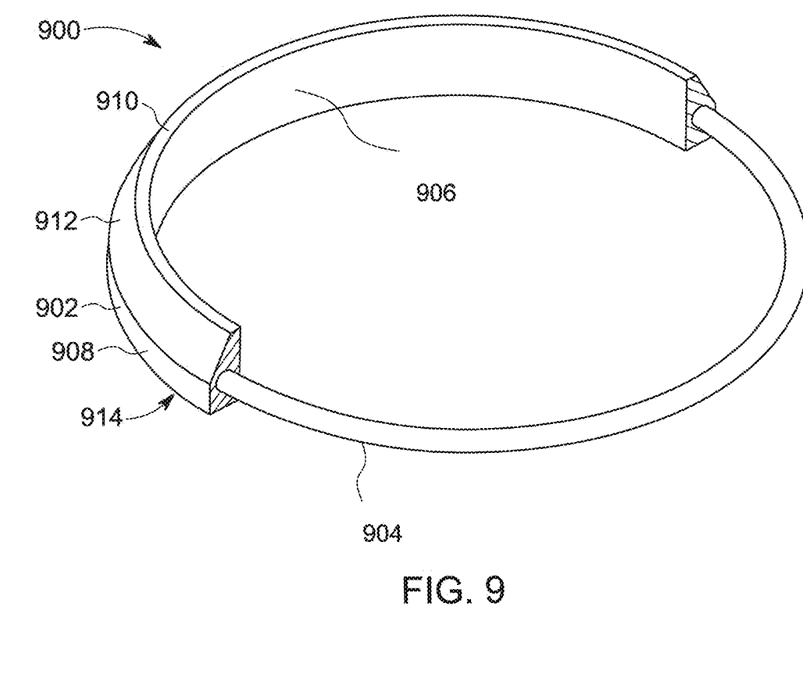
FIG. 9 illustrates a seal with a first elastomeric element partially cut away to display a second elastomeric element extending through the first elastomeric element, according to an embodiment.

FIG. 9 illustrates a seal 900 with a first elastomeric element 902 and a second elastomeric element 904 extending through the first elastomeric element 902. The first elastomeric element 902 and the second elastomeric element extend annularly to form a ring. The second elastomeric element 904 is shaped cylindrically, though the second elastomeric element 904 could be shaped otherwise, as desired. The first elastomeric element 902 is shaped like a trapezoid, with a first sealing surface 906 parallel to a second sealing surface 908, a first pressing surface 910, and a second pressing surface 912 obliquely angled relative to a third pressing surface 914. The first sealing surface 906 can be flat and broad relative to the other surfaces, to offer a relatively large surface area over which to contact and seal against another object. For example, if used in pipe connector 10 of FIGS. 1-5, the first sealing surface 906 would contact and be pressed against the pipe 400. To reduce volume of space occupied by the seal 900 due to the relatively large size of the first sealing surface 906, the second pressing surface 912 can be angled obliquely relative to the third pressing surface 914.

Opposing forces can be applied against the first pressing surface 910 and the third pressing surface 914 to compress the seal 900 and deform the seal 900 perpendicularly outward from each of the first sealing surface 906 and the second sealing surface 908. Additionally applying a force to the second pressing surface 912 opposite the force applied to the third pressing surface 914, can facilitate force vectors against the seal 900 varied from the direction of movement of two objects or surfaces compressing the seal 900. In particular, pressing against the second pressing surface 912 toward the third pressing surface 914 can add force toward the first sealing surface 906.

Alternatively, the force applied to the second sealing surface 912 can be in place of the force applied to the first sealing surface 910, in which case the first sealing surface 910 can be omitted and the second sealing surface 912 can join directly with the first contact surface 906.

Further alternatively, while the seal 900 is shown as a right-angled trapezoid, the third pressing surface 914 can be angled obliquely with respect to the first contact surface 906 and/or the second contact surface 908 to additionally modify the compression forces.

Figure 10:
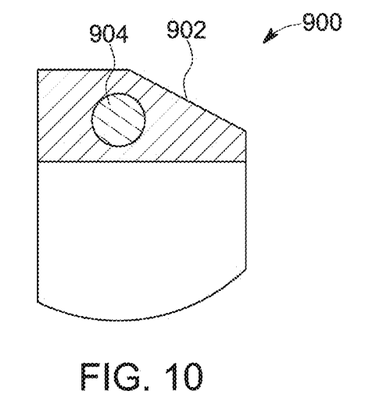
FIG. 10 shows a cross-section of the seal of FIG. 9.
Figure 11:
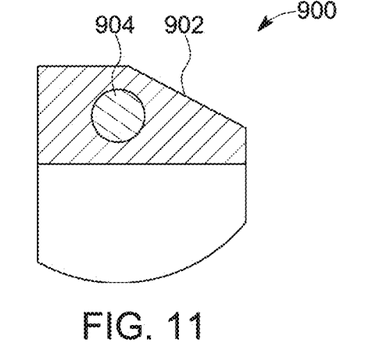
FIG. 11 shows a cross-section of an alternatively sized embodiment of the seal of FIG. 9.
Figure 12:
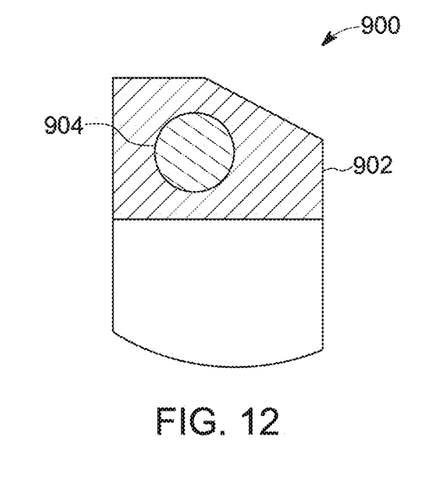
FIG. 12 shows a cross-section of an alternatively sized embodiment of the seal of FIG. 9.

FIGS. 10, 11, and 12 show cross-sections of differently sized versions of the seal 900.

Though FIGS. 1-9 illustrate the seal 200, 270, 280, 900 in the shape of a ring or loop, the seal 200, 270, 280, 900 may be formed in any desired shape, such as a simple linear shape or a complex shape congruent to a shape of two surfaces intended to be sealed.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A seal, the seal comprising:
   a first elastomeric ring having an annular cavity, a first annular center axis, a plurality of annular channels extending radially away from the first annular center axis, and a plurality of annular protrusions extending radially away from the first annular center axis; and
   a second elastomeric ring in the annular cavity having a second annular center axis, and a plurality of annular protrusions extending radially away from the second annular center axis, the plurality of annular protrusions protruding into the annular channels.

2. The seal of claim 1, wherein an outer surface of the second elastomeric ring is configured to move relative to an inner surface of the first elastomeric ring.

3. The seal of claim 1, wherein an outer surface of the second elastomeric ring is configured to abut directly against an inner surface of the first elastomeric ring.

4. The seal of claim 1, the first elastomeric ring being concentric with the second elastomeric ring.

5. The seal of claim 1, the first elastomeric ring encasing the second elastomeric ring.

6. The seal of claim 1, wherein the first elastomeric ring has a first hardness, the second elastomeric ring has a second hardness, the second hardness being greater than the first hardness.

7. The seal of claim 1, wherein the first elastomeric ring has a hollow cross section, and the second elastomeric ring has a solid cross section.

8. The seal of claim 1, wherein the protrusions of the first elastomeric ring are located equidistantly along a circumference perpendicular to the first annular center axis at a point along the first annular center axis.

9. The seal of claim 1, wherein the protrusions of the first elastomeric ring have an edge most radially distant from the first annular center axis, the edge being rounded in a cross-sectional plane of the first elastomeric ring.

10. The seal of claim 1, wherein a cross-sectional shape of the annular cavity is a circle, and a cross-sectional shape of the second elastomeric ring is a solid circle.

11. The seal of claim 1, wherein the annular protrusions of the second elastomeric ring are located equidistantly along a circumference perpendicular to the second annular center axis at a point along the second annular center axis.

12. The seal of claim 1, wherein the protrusions of the second elastomeric ring have an edge most radially distant from the second annular center axis, the edge being rounded in a cross-sectional plane of the second elastomeric ring.

13. The seal of claim 1, wherein the first elastomeric element has a trapezoidal-shaped cross-section.

14. A seal, the seal comprising:
    a first elastomeric element having a length extending along an axis, a first surface facing radially outward with respect to the axis, a second surface facing radially inward with respect to the axis, and a plurality of channels extending radially outward with respect to the axis through the second surface, the second surface defining a cavity extending along the axis; and
    a second elastomeric element in the cavity, the second elastomeric element having a first surface facing radially outward with respect to the axis, and a plurality of protrusions extending radially outward with respect to the axis, the plurality of protrusions protruding into the channels.

15. The seal of claim 14, wherein the first surface of the second elastomeric element is configured to move relative to the second surface of the first elastomeric element.

16. The seal of claim 14, wherein the first surface of the second elastomeric element is immediately adjacent the second surface of the first elastomeric element.

17. The seal of claim 14, wherein the first elastomeric element and the second elastomeric element are concentric.

18. The seal of claim 14, wherein the first elastomeric element encases the second elastomeric element.

19. The seal of claim 14, wherein the first elastomeric element has a first hardness and the second elastomeric element has a second hardness, the second hardness being greater than the first hardness.

20. The seal of claim 14, wherein the first elastomeric element has a first elasticity and the second elastomeric element has a second elasticity, the first elasticity being greater than the second elasticity.

21. The seal of claim 14, wherein the first elastomeric element has a trapezoidal-shaped cross-section.

22. A pipe fitting assembly, the pipe fitting assembly comprising:
    a pipe fitting having a body, the body having an outer wall, the outer wall positioned around a flow channel; and
    a seal configured to be compressed between the outer wall and a pipe, the seal including:
    a first elastomeric element having a length extending along an axis, a first surface facing radially outward with respect to the axis, a first plurality of protrusions extending radially outward with respect to the axis, a second surface facing radially inward with respect to the axis, and a plurality of channels extending radially outward with respect to the axis through the second surface, the second surface defining a cavity extending along the axis; and
    a second elastomeric element in the cavity, the second elastomeric element having a first surface facing radially outward with respect to the axis, and a second plurality of protrusions extending radially outward with respect to the axis, the second plurality of protrusions protruding into the channels.

23. The seal of claim 1, wherein the first elastomeric element includes a first sealing surface, a second sealing surface opposite and substantially parallel to the first sealing surface, a first pressing surface connecting the first sealing surface to the second sealing surface, and a second pressing surface between the first sealing surface and the second sealing surface, the second pressing surface angled obliquely relative to the first pressing surface.

24. The seal of claim 14, wherein the first elastomeric element includes a first sealing surface, a second sealing surface opposite and substantially parallel to the first sealing surface, a first pressing surface connecting the first sealing surface to the second sealing surface, and a second pressing surface between the first sealing surface and the second sealing surface, the second pressing surface angled obliquely relative to the first pressing surface.

25. The pipe fitting assembly of claim 22, wherein the first elastomeric element includes a first sealing surface, a second sealing surface opposite and substantially parallel to the first sealing surface, a first pressing surface connecting the first sealing surface to the second sealing surface, a second pressing surface and a third pressing surface between the first sealing surface and the second sealing surface, the second pressing surface angled obliquely relative to the first pressing surface, the third pressing surface opposite and substantially parallel to the first pressing surface.

26. The seal of claim 23, wherein the first elastomeric element further includes a third pressing surface between the second pressing surface and the second sealing surface, the third pressing surface opposite and substantially parallel to the first pressing surface.

27. The seal of claim 23, wherein an angle between the first pressing surface and the second pressing surface is approximately 62 degrees.

* * * * *